(12) United States Patent
Kobayashi

(10) Patent No.: US 8,085,450 B2
(45) Date of Patent: Dec. 27, 2011

(54) IMAGE READING APPARATUS AND IMAGE READING METHOD

(75) Inventor: Kenji Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 943 days.

(21) Appl. No.: 12/079,738

(22) Filed: Mar. 28, 2008

(65) Prior Publication Data

US 2008/0239412 A1    Oct. 2, 2008

(30) Foreign Application Priority Data

Mar. 28, 2007  (JP) ................... 2007-085560

(51) Int. Cl.
*H04N 1/04* (2006.01)
(52) U.S. Cl. ......... 358/509; 358/505; 358/514; 358/474
(58) Field of Classification Search ................... 358/509, 358/505, 474, 514, 413
See application file for complete search history.

(56) References Cited

U.S. PATENT DOCUMENTS 6,657,750 B1 * 12/2003 Ando ........................... 358/474

FOREIGN PATENT DOCUMENTS

| JP | 60-079864 | 5/1985 |
| JP | 11-055471 | 2/1999 |
| JP | 11-284800 | 10/1999 |
| JP | 11-298673 | 10/1999 |
| JP | 2002-218264 | 8/2002 |
| JP | 2003-152960 | 5/2003 |

* cited by examiner

*Primary Examiner* — Houshang Safaipour
(74) *Attorney, Agent, or Firm* — Nutter McClennen & Fish LLP; John J. Penny, Jr.; Christina M. Sperry

(57) ABSTRACT

The invention provides, as an aspect thereof, an image reading apparatus including a light irradiating unit that has a red-light irradiating sub-unit that irradiates red light onto a reading target object, a green-light irradiating sub-unit that irradiates green light onto the reading target object, and a blue-light irradiating sub-unit that irradiates blue light onto the reading target object; a reading unit that detects the amount of each of the red, green, and blue lights; a setting unit that sets an irradiation time period for each of the red, green, and blue lights on the basis of the corresponding amount of light detected by the reading unit by commanding each of the red-light, green-light, and blue-light irradiating sub-units to irradiate light; and a controlling unit that commands the red-light, green-light, and blue-light irradiating sub-units to irradiate light.

3 Claims, 5 Drawing Sheets

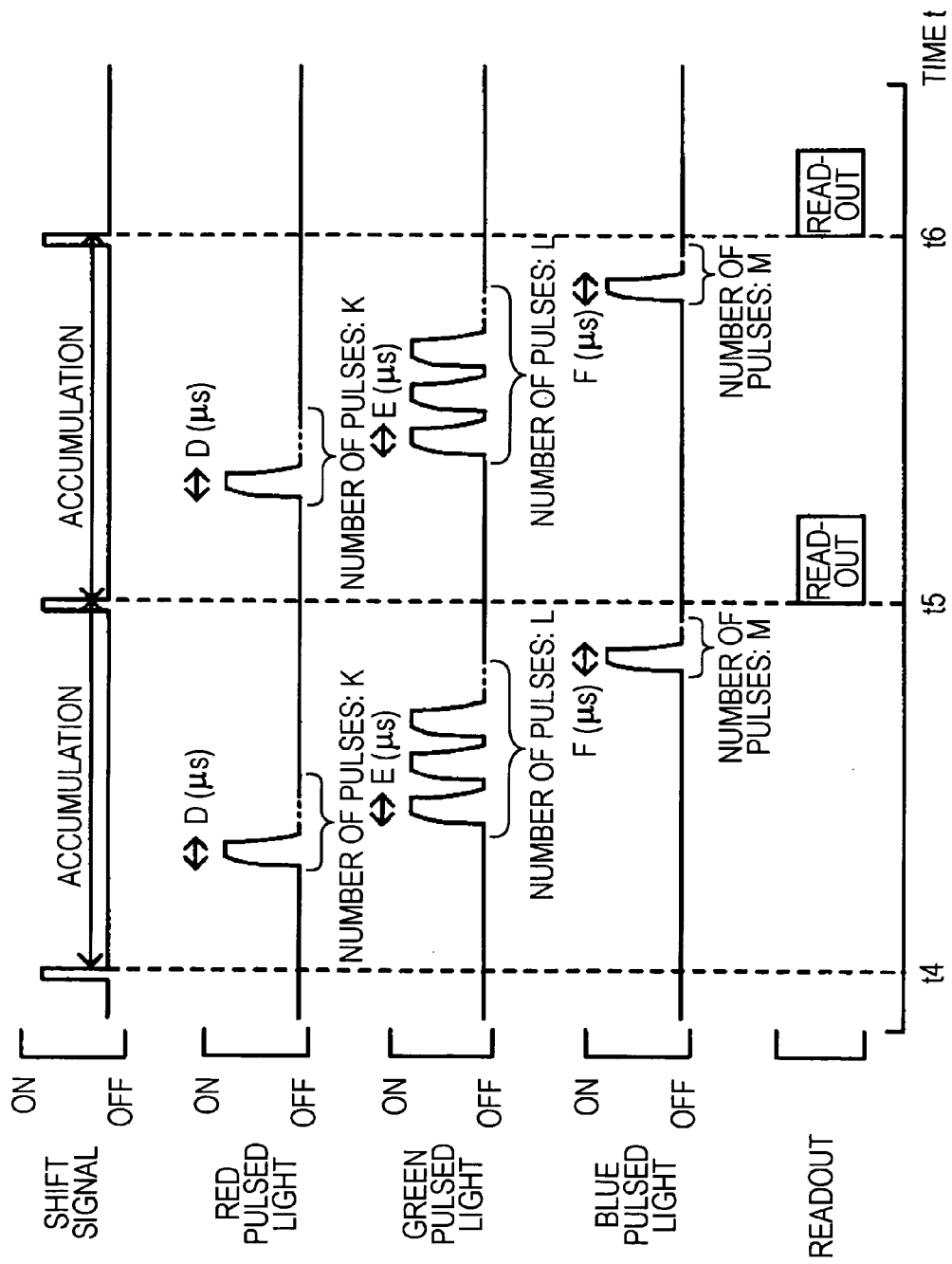

IMAGE READING APPARATUS AND IMAGE READING METHOD

BACKGROUND

1. Technical Field

The present invention relates to an image reading apparatus and an image reading method.

2. Related Art

In the technical field to which the present invention pertains, an original document input system that uses light sources corresponding to three color components is known. For example, an original document input system of the related art controls the lighting-up operations (or in other words, the ON/OFF states) of light emitting diodes (LED), which are light sources corresponding to three color components, by controlling the lighting-up time period, that is, the duration of illumination, of the light-source LEDs in synchronization with start pulses that define the accumulation time period of electric charge. An example of such an original document input system of the related art is described in JP-A-11-55471.

When the related-art original document input system described in JP-A-11-55471 controls the lighting-up operations of the three-color light-source LEDs, it is conceivable to adjust the light amount thereof by varying the lighting-up time period of these three-color LEDs as in a case where, for example, monochrome image scanning is carried out. Generally speaking, it takes a certain length of a pulse rise time period from a point in time at which a voltage is applied to a point in time at which the amount of light reaches a certain ON level. Similarly, it takes a certain length of a pulse fall time period from a point in time at which the application of a voltage is ceased to a point in time at which the amount of light reaches a certain OFF level. For this reason, in the controlling of the lighting-up operations of the three-color light-source LEDs performed by the original document input system of the related art such as one described in JP-A-11-55471, the actual ratio of light amount among these three-color light-source LEDs could deviate from a desired ratio because of the above-explained delay time if the durations of illumination thereof are set without any appropriate technical consideration.

SUMMARY

An advantage of some aspects of the invention is to provide an image reading apparatus that is capable of performing an enhanced monochrome reading while illuminating light from a light source that is provided for each of red color component, green color component, and blue color component. In addition, the invention further provides, as an advantage of some aspects thereof, an image reading method that achieves such an enhanced monochrome reading.

In order to address the above-identified problems without any limitation thereto, the invention adopts any of the following novel and inventive configurations and features.

The invention provides, as a first aspect thereof, an image reading apparatus including: a light irradiating section that has a red-light irradiating sub-section that irradiates red light onto a reading target object, a green-light irradiating sub-section that irradiates green light onto the reading target object, and a blue-light irradiating sub-section that irradiates blue light onto the reading target object; a reading section that detects the amount of each of the red light, the green light, and the blue light; a setting section that sets an irradiation time period for each of the red light, the green light, and the blue light on the basis of the corresponding amount of light detected by the reading section by commanding each of the red-light irradiating sub-section, the green-light irradiating sub-section, and the blue-light irradiating sub-section to irradiate light for the number of times S (where S is the sum of K, L, and M, each of which is a positive integer, where at least one of K, L, and M differs in its value from other two thereof); and a controlling section that commands the red-light irradiating sub-section, the green-light irradiating sub-section, and the blue-light irradiating sub-section to irradiate light for the respective number of times K, L, and M for the respective irradiation time periods during each reading instruction signal time interval that is set for the reading section to read out an image of the reading target object.

In the configuration of an image reading apparatus according to the first aspect of the invention described above, the setting section setting section sets an irradiation time period for each of the red light, the green light, and the blue light on the basis of the corresponding amount of light detected by the reading section by commanding each of the red-light irradiating sub-section, the green-light irradiating sub-section, and the blue-light irradiating sub-section to irradiate light for the number of times S (where S is the sum of K, L, and M, each of which is a positive integer, where at least one of K, L, and M differs in its value from other two thereof). In addition, the controlling section commands the red-light irradiating sub-section, the green-light irradiating sub-section, and the blue-light irradiating sub-section to irradiate light for the respective number of times K, L, and M for the respective irradiation time periods during each reading instruction signal time interval that is set for the reading section to read out an image of the reading target object. As explained above, in the configuration of the image reading apparatus according to the first aspect of the invention described above, the amount of light is controlled on the basis of the number of times of irradiations thereof. Therefore, advantageously, it is possible to irradiate the red light, the green light, and the blue light that has an accurate or appropriate light-amount ratio among them that is significantly less vulnerable to a delay in light-amount change or to the level of such a change at the rising and falling of irradiations. In the configuration of the image reading apparatus according to the first aspect of the invention described above, monochrome reading is carried out upon outputting a reading instruction signal after the irradiation of red light, green light, and blue light. Therefore, it is possible to perform an enhanced (i.e., appropriate) monochrome reading while emitting light from each light source of red light, green light, and blue light. Herein, the term "light-amount ratio" means a proportion of red (R) light that is emitted onto the reading target object to green (G) light that is emitted onto the reading target object to blue (B) light that is emitted onto the reading target object. The target value of the light-amount ratio may be determined, for example, empirically within such a range that a user never perceives any unnaturalness in an image that is read out from the reading target object. The set of values K, L, and M corresponds to the target light-amount ratio of red light, green light, and blue light. In a simple configuration example, it can be assumed that the set of values K, L, and M equals the target light-amount ratio A: B: C; that is, the value K=the value A; the value L=the value B; and the value M=the value C. As another example, it may be set in such a manner that the following mathematical formula holds true: the value K=the value mA; the value L=the value mB; and the value M=the value mC, where "m" is any positive integer.

In the configuration of an image reading apparatus according to the first aspect of the invention described above, it is preferable that the setting section should set an irradiation time period for each of the red light, the green light, and the blue light in such a manner that the corresponding amount of light detected by the reading section falls within an appropriate range by commanding each of the red-light irradiating sub-section, the green-light irradiating sub-section, and the blue-light irradiating sub-section to irradiate light onto a reference plate for the number of times S. With such a configuration, since the reference plate is adopted, it is possible to configure (i.e., set) an irradiation time period for each of the red light, the green light, and the blue light in such a manner that the amount of light per one irradiation falls within an appropriate range (i.e., an appropriate value).

The invention provides, as a second aspect thereof, an image reading method for reading out an image by irradiating red light, green light, and blue light onto a reading target object, the image reading method including: setting an irradiation time period for each of the red light, the green light, and the blue light on the basis of the corresponding detection amount of light by commanding each of the red light, the green light, and the blue light to be irradiated for the number of times S (where S is the sum of K, L, and M, each of which is a positive integer, where at least one of K, L, and M differs in its value from other two thereof); and commanding each of the red light, the green light, and the blue light to be irradiated for the respective number of times K, L, and M for the respective irradiation time periods during each reading instruction signal time interval that is set for an image of the reading target object to be read out.

In the image reading method according to the second aspect of the invention described above, an irradiation time period is set for each of the red light, the green light, and the blue light on the basis of the corresponding detection amount of light by commanding each of the red light, the green light, and the blue light to be irradiated for the number of times S (where S is the sum of K, L, and M, each of which is a positive integer, where at least one of K, L, and M differs in its value from other two thereof). In addition, in the image reading method according to the second aspect of the invention described above, each of the red light, the green light, and the blue light is irradiated for the respective number of times K, L, and M for the respective irradiation time periods during each reading instruction signal time interval that is set for an image of the reading target object to be read out. As explained above, in the image reading method according to the second aspect of the invention described above, the amount of light is controlled on the basis of the number of times of irradiations thereof. Therefore, advantageously, it is possible to irradiate the red light, the green light, and the blue light that has an accurate or appropriate light-amount ratio among them that is significantly less vulnerable to a delay in light-amount change or to the level of such a change at the rising and falling of irradiations. In the image reading method according to the second aspect of the invention described above, monochrome reading is carried out upon outputting a reading instruction signal after the irradiation of red light, green light, and blue light. Therefore, it is possible to perform an enhanced (i.e., appropriate) monochrome reading while emitting light from each light source of red light, green light, and blue light. It should be noted that further step(s) may be added to the above basic steps of the image reading method according to the second aspect of the invention described above in order to realize operation/working-effects and/or functions that are offered by constituent elements of the image reading apparatus according to the first aspect of the invention described above.

BRIEF DESCRIPTION OF THE DRAWINGS

The invention will be described with reference to the accompanying drawings, wherein like numbers reference like elements.

FIG. 4 is a timing chart that schematically illustrates an example of the level state of a shift signal that gives a reading cue when each of red light, green light, and blue light is irradiated onto an image scan target original document P as well as the level state of each of the red light, the green light, and the blue light according to an exemplary embodiment of the invention, which applies at the time of monochrome reading.

DESCRIPTION OF EXEMPLARY EMBODIMENTS

Figure 1:
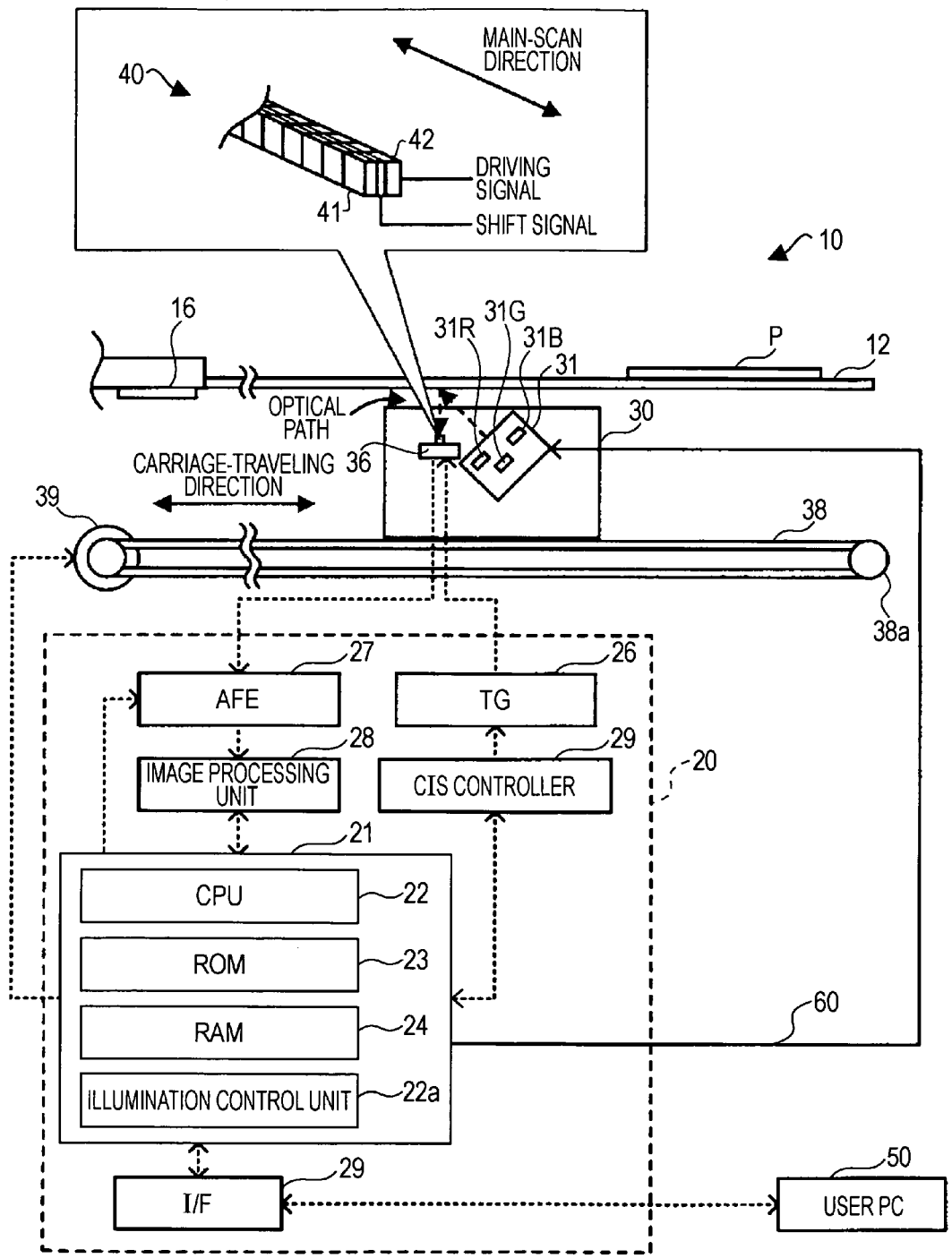
FIG. 1 is a diagram that schematically illustrates an example of the configuration of an image scanning apparatus 10 according to an exemplary embodiment of the invention.

With reference to the accompanying drawings, the best mode of the invention is explained below. FIG. 1 is a diagram that schematically illustrates an example of the configuration of an image scanning apparatus 10 according to an exemplary embodiment of the invention. As illustrated in FIG. 1, the image scanning apparatus 10 is provided with a carriage 30, a controlling unit 20, and a driving motor 39. The carriage 30 reads an image scan target original document (e.g., paper) P, which is placed on a reading surface 12, so as to acquire a scanned image thereof. The reading surface 12 is configured as, for example, a glass sheet. The controlling unit 20 is responsible for controlling the operations of the image scanning apparatus 10 as a whole. The driving motor 39 supplies a driving force to the carriage 30 for movement thereof.

The carriage 30 is provided with a light source unit 31 and a contact image sensor (hereafter abbreviated as "CIS") 36. The light source unit 31 of the carriage 30 emits light onto the image scan target original document P, which is placed on the reading surface 12. The CIS 36 of the carriage 30 receives light reflected by the image scan target original document P so as to acquire a scanned image thereof. The light source unit 31 has a red LED 31R, a green LED 31G, and a blue LED 31B as the internal light-emitting elements thereof. The red LED 31R emits red light onto the image scan target original document P. The green LED 31G emits green light onto the image scan target original document P. The blue LED 31B emits blue light onto the image scan target original document P. Each of these red LED 31R, green LED 31G, and blue LED 31B is a light-emitting device that emits light when an electric current is applied thereto. It is possible to control the light emission of each of these red LED 31R, green LED 31G, and blue LED 31B by controlling the electric current that passes therethrough. The CIS 36 has an element array 40 that receives each of red reflected light, green reflected light, and blue reflected light and then outputs a signal having an intensity (i.e., level) that is in accordance with the optical amount of corresponding received light. The element array 40 of the CIS 36 is made up of, though not necessarily limited thereto, a plurality of photodiodes 41 and a plurality of CCDs 42. Each of the plurality of photodiodes 41, which are photoelectric conversion elements corresponding to pixels, is exposed to external light and converts incident light into electric charge, which is accumulated after light exposure and photoelectric conversion. Each of the plurality of CCDs 42 is provided for the corresponding one of the plurality of photodiodes 41. Each of the plurality of CCDs 42 transfers electric charge that is received from the corresponding photodiode 41. A carriage belt 38 is wound around the master driving motor 39 at one side thereof and wound around a slave driven roller 38a at the other side thereof so as to be stretched with a moderate tension between the master driving motor 39 and the slave driven roller 38a. The master driving motor 39 is mounted on one end of the body (i.e., chassis) of the image scanning apparatus 10 whereas the slave driven roller 38a is mounted on the other end thereof. As the driving motor 39 applies a driving force to the carriage belt 38, the carriage 30 moves in a predetermined carriage-traveling direction (i.e., along the sub-scan direction). In the exemplary configuration of the image scanning apparatus 10 described above, it is assumed that the CIS 36 is configured as a CCD image sensor. However, the configuration of the CIS 36 is not limited to such a specific example. As a non-limiting modification example thereof, the CIS 36 may be configured as a CMOS image sensor. In addition, in the exemplary configuration of the image scanning apparatus 10 described above, it is assumed that the CIS 36 has the element array 40 that is configured as a line of imaging devices (41, 42) that are aligned in the main scan direction (refer to FIG. 1). However, the configuration of the CIS 36 is not limited to such a specific example. As a non-limiting modification example thereof, the element array 40 of the CIS 36 may be configured as two or more lines of imaging devices (41, 42) that are aligned in the main scan direction.

The controlling unit 20 is provided with a main controller 21, a CIS controller 25, a timing generator (hereafter abbreviated as "TG") 26, an analog front end (hereafter abbreviated as "AFE") 27, an image-processing unit 28, and a user interface (I/F) 29. The main controller 21 is responsible for managing the entire operations of the image scanning apparatus 10. The CIS controller 25 drives and controls the CIS 36. The TG 26 outputs, to the CIS 36, a variety of timing signals that indicates the start timing of the operations of the CIS 36. The AFE 27 amplifies an electric signal that is outputted from the CIS 36 and then converts the amplified signal, which is an analog signal, into a digital signal. The image-processing unit 28 performs various kinds of image processing such as gamma correction and the like on the digital signal supplied from the AFE 27 so as to create digital image data. The user I/F 29 enables the image scanning apparatus 10 to be electrically connected to a variety of external devices including but not limited to a user personal computer (PC) 50. The main controller 21 is configured as a microprocessor having a CPU 22, which functions as the central component, that is, the brain component thereof. In addition to the CPU 22, the main controller is provided with a ROM 23 that stores a processing program and a variety of tables, a RAM 24 that temporarily stores data, an illumination control unit 22a that controls the ON/OFF state of each of the red LED 31R, the green LED 31G, and the blue LED 31B of the light source unit 31, and an input-output (I/O) port that is not shown in the drawing. The ROM 23 stores a target light-amount ratio "A: B: C" that indicates a target ratio of the optical amount of red light that is irradiated on the image scan target original document P to the optical amount of green light that is irradiated thereon to the optical amount of blue light that is irradiated thereon, where each of A, B, and C is a positive integer. It should be particularly noted that at least one of A, B, and C differs in its value from other two thereof. In the present embodiment of the invention, it is assumed that the target light-amount ratio A: B: C is set as 1: 3: 1, which is, needless to say, a non-limiting example thereof. The target light-amount ratio A: B: C is a proportion of red (R) light that is emitted onto the image scan target original document P to green (G) light that is emitted onto the image scan target original document P to blue (B) light that is emitted onto the image scan target original document P when monochrome image scanning is performed. The target light-amount ratio A: B: C is determined empirically within such a range that a user never perceives any unnaturalness in the imaging result obtained after the monochrome reading. Various kinds of signals including a reading instruction (e.g., scanning command) and the like are inputted from the user I/F 29 into the main controller 21. In addition, a variety of signals including but not limited to a digital image data signal is inputted from the image-processing unit 28 into the main controller 21. The main controller 21 outputs a driving signal to the driving motor 39. In addition thereto, the main controller 21 outputs a digital image data signal to the user I/F 29. Moreover, the main controller 21 outputs a main clock signal and a reading instruction signal to the CIS controller 25. These signals are non-limiting examples of a variety of signals outputted by the main controller 21. Furthermore, the main controller 21 supplies power to each of the red LED 31R, the green LED 31G, and the blue LED 31B of the light source unit 31 via a power supply line 60.

The CIS controller 25 outputs, to the TG 26, a driving signal that cues the start timing of readout operations performed by the CIS 36, which is generated on the basis of a main clock signal supplied thereto from the main controller 21. The TG 26 specifies the output timing of a driving signal that is issued to the CCDs 42 of the CIS 36 and further specifies the output timing of a shift signal that commands electric charge to be moved from the photodiodes 41 to the CCDs 42. Then, the TG 26 outputs these timing signals to the CIS 36. Upon reception of a shift signal from the TG 26, the CIS 36 transfers electric charge that has been accumulated in the photodiodes 41 to the CCDs 42. Upon reception of a driving signal from the TG 26, the CIS 36 outputs electric charge retained at the CCDs 42 to the AFE 27. The AFE 27 reads electric charge that has been discharged from the CIS 36 as an input analog image signal. Specifically, the AFE 27 acquires electric charge discharged therefrom through a correlated double sampling (which is abbreviated as "CDS" herein) circuit while reducing a noise thereof. Then, the AFE 27 amplifies the level of the acquired analog image signal to an appropriate level via a variable amplifier. Subsequently, the AFE 27 converts the amplified analog image signal into digital one that has approximately 10-16 bits. The image-processing unit 28 performs a variety of image processing including but not limited to white-balancing processing and gamma-correction processing on the input digital image signal supplied from the AFE 27 so as to generate digital image data.

Figure 2A:
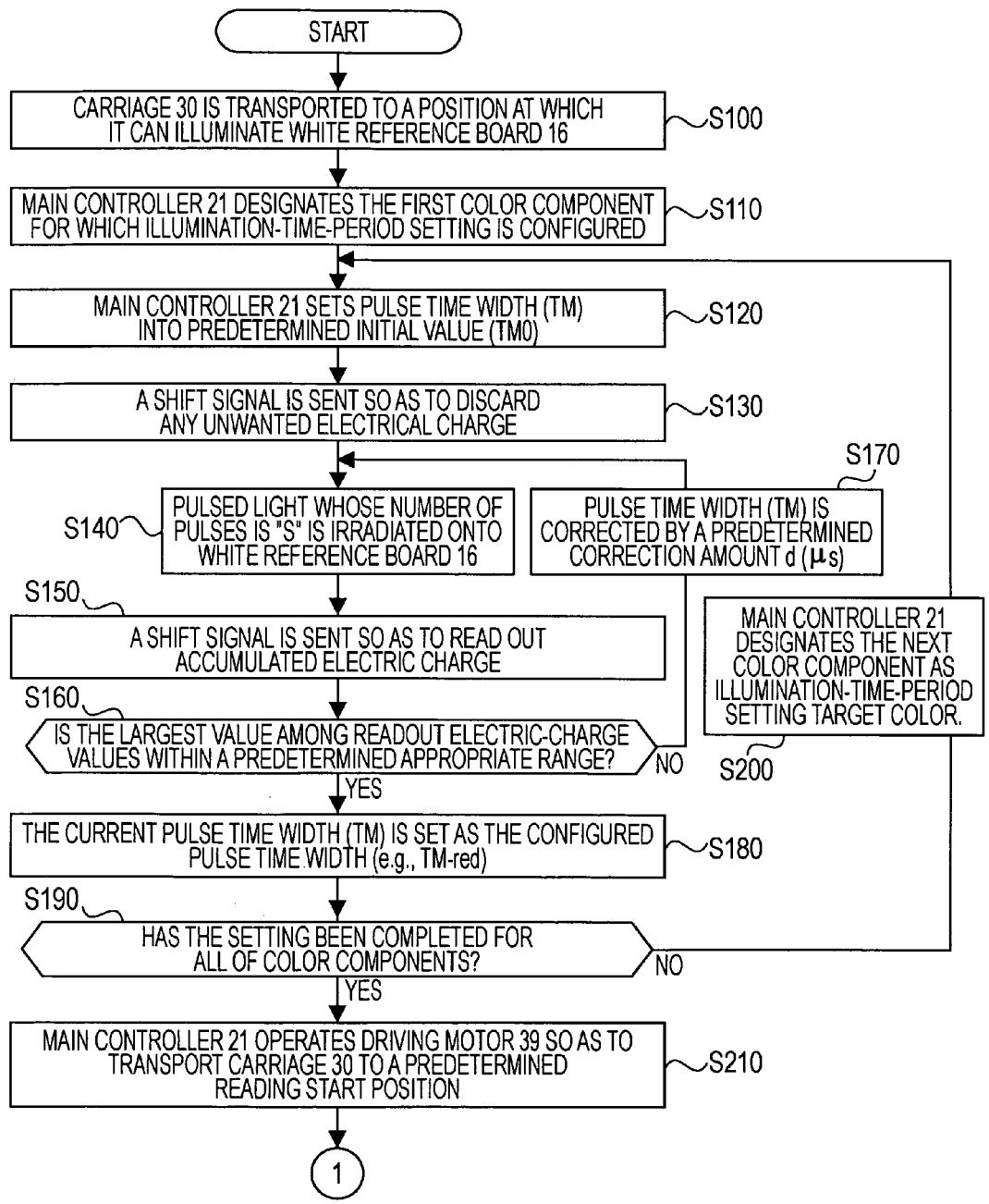
FIG. 2 (FIGS. 2A and 2B) is a flowchart that illustrates an example of a monochrome image reading procedure that is executed by the image scanning apparatus 10 according to an exemplary embodiment of the invention.
Figure 2B:
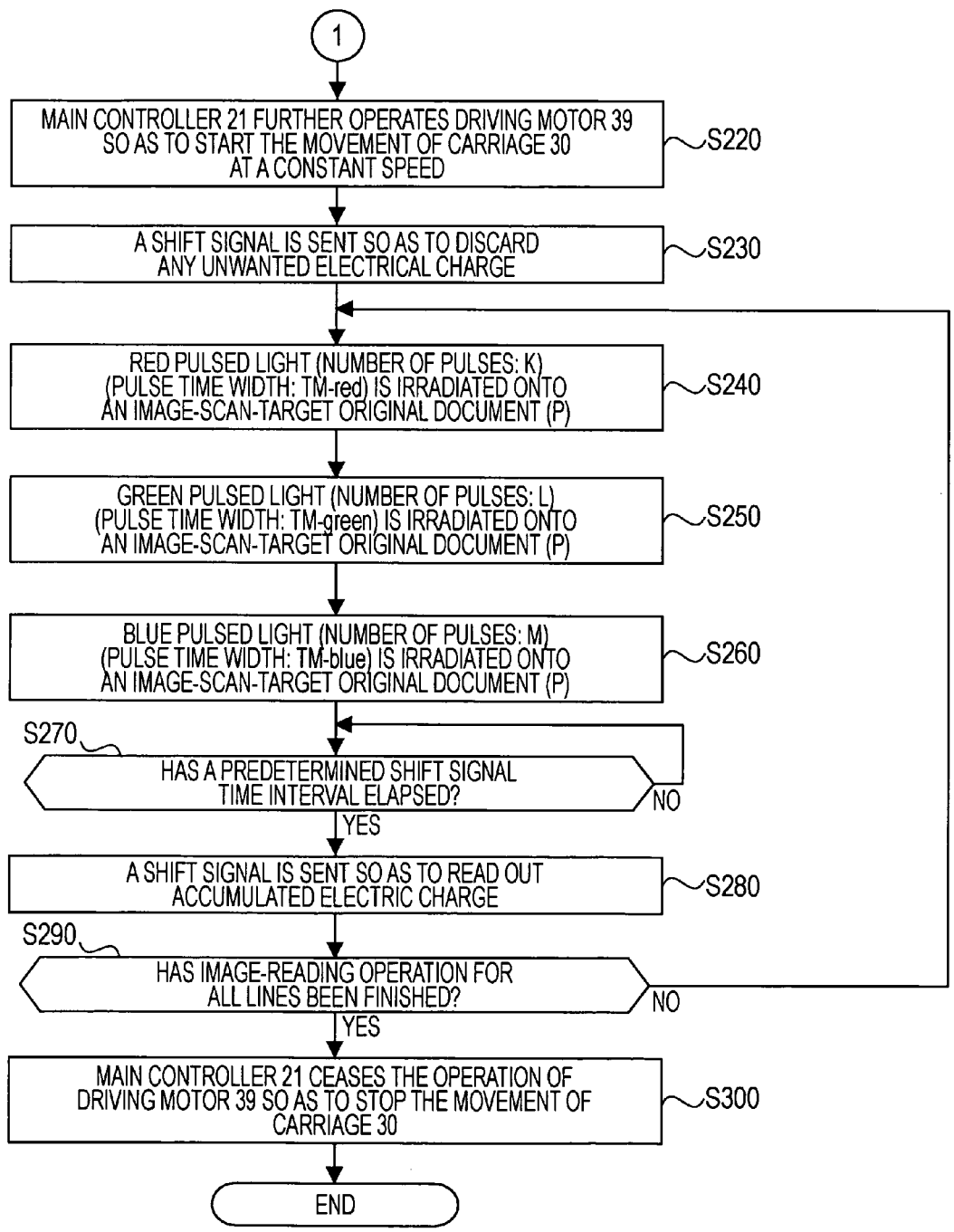

Next, with reference to the accompanying drawings, the operations of the image scanning apparatus 10 according to the present embodiment of the invention, which has the exemplary configuration described above, are explained below. In particular, in the following description, the procedure of reading the image scan target original document P is explained. FIG. 2 is a flowchart that illustrates an example of a monochrome image reading procedure that is executed by the CPU 22 of the main controller 21 of the image scanning apparatus 10 according to an exemplary embodiment of the invention. The monochrome image reading processing flow illustrated in FIG. 2 is initiated when a user presses down a scan start button, which is not illustrated in the accompanying drawings, so as to command the image scan target original document P, which could be a color manuscript or a monochrome manuscript, to be read as a monochrome image. Upon the start of the monochrome image reading processing routine (i.e., processing flow), as a first step thereof, the CPU 22 of the main controller 21 controls the operation of the driving motor 39 in such a manner that the carriage 30 is transported to a position at which it can illuminate a white reference board 16 (step S100). Then, the CPU 22 of the main controller 21 designates the (predetermined) first color component for which setting is configured on the length of a time period during which light is irradiated onto the image scan target original document P (step S110). Specifically, in this step S110, the CPU 22 of the main controller 21 designates the first color component (e.g., red) (hereafter may be referred to as "illumination-time-period setting target color (irradiation-time-period setting target color)" as long as the context allows) for which setting is configured on the length of a time period during which light is irradiated (hereafter may be referred to as either "pulse time width" or "pulse duration" as long as the context allows) onto the image scan target original document P. Each one execution of emission of light onto the image scan target original document P may be hereafter referred to as "pulse" as long as the context allows. After designating the first color component as the illumination-time-period setting target color in the step S110, the CPU 22 of the main controller 21 sets the pulse time width thereof, which is hereafter denoted as TM, into a predetermined initial value TM0 (step S120). For example, it is assumed herein that the predetermined default value TM0 is 100 µs. In the present embodiment of the invention, it is assumed that the pulse time width is set for red light, green light, and blue light in the order of appearance herein. It is further assumed in the present embodiment of the invention that a value stored in the ROM 23 is read out and set as the predetermined initial value TM0. Then, in the step S130, a shift signal is sent out so as to discard any unwanted electrical charge accumulated thereat. As the next step, the operation of the red LED 31R is controlled in such a manner that pulsed light whose number of pulses is S and whose pulse time width is a currently set value is irradiated onto the white reference board 16 (step S140). Herein, the number of pulses S of the pulsed light is the sum of K, L, and M, each of which is a positive integer. It should be particularly noted that at least one of K, L, and M differs in its value from other two thereof. The currently set value of the pulse time width of the pulsed light should be the predetermined initial value TM0 at the time of initial setting configuration for each color component. Specifically, in this step, the illumination control unit 22a of the main controller 21 supplies an electric current to the red LED 31R in an intermittent manner so as to control the operation thereof. In order to simplify explanation, it is assumed in the present embodiment of the invention that the above-mentioned set of values K, L, and M corresponds to (i.e., equals) the aforementioned target light-amount ratio A: B: C. That is, it is assumed herein that the following set of mathematical formulas holds true: the value K=the value A; the value L=the value B; and the value M=the value C. The reason why the pulsed light that is irradiated onto the white reference board 16 should have the number of pulses S is that, with such a pulse configuration, it is possible to significantly reduce any deviation in the amount of light. As has already been described above, generally speaking, it takes a certain length of a pulse rise time period from a point in time at which a voltage is applied to the red LED 31R to a point in time at which the amount of red light reaches a certain ON level. Similarly, it takes a certain length of a pulse fall time period from a point in time at which the application of a voltage to the red LED 31R is ceased to a point in time at which the amount of red light reaches a certain OFF level. This is attributable to capacitance that resides on, for example, the power supply line 60. As a consequence thereof, generally speaking again, there could occur possible deviation in the amount of red light thereof. The exemplary pulse configuration described above in which the pulsed light has the number of pulses S makes it possible to significantly reduce such deviation in the amount of light. The setting of the pulse time width for the green LED 31G is configured in the same manner as done above, which is followed by the setting configuration thereof for the blue LED 31B. By this means, the amount of light per pulse that is irradiated from each LED is equalized as much as possible. In a pulse configuration according to the present embodiment of the invention, the ratio of the number of pulses of red pulse light, green pulse light, and blue pulse light that are emitted in steps S240, S250, and S260, respectively, which will be described later, is set to be the same as the ratio of the amount of light thereof. By this means, the above-described pulse rise time period and the above-described pulse fall time period are included in these R pulsed light, G pulsed light, and B pulsed light with the same ratio as the target light-amount ratio A: B: C. Therefore, it is possible to obtain a fairly good approximation of the target light-amount ratio A: B: C in actual irradiation of these R pulsed light, G pulsed light, and B pulsed light. As explained above, each of the pulse time width "TM-red", the pulse time width "TM-green", and the pulse time width "TM-blue" is set while emitting the number of pulses S. As has already been described above, in the pulse configuration according to the present embodiment of the invention, it is assumed that the target light-amount ratio A: B: C is set as 1: 3: 1; and thus, it follows that the values K, L, and M are 1, 3, and 1. Therefore, the R pulsed light whose number of pulses is five, which is the sum of K (1), L (3), and M (1), is emitted from the red LED 31R. In the next step, a shift signal is sent to the CIS 36 so as to read out electric charge that is accumulated in the plurality of photodiodes 41 that are arrayed along the main scan direction (step S150). Note that the electric charge that is read out in this step has been accumulated in the plurality of photodiodes 41 as a result of the irradiation of pulsed light whose number of pulses is S (which is assumed to be five pulses in the present embodiment of the invention as explained above). In the next step, a judgment is made as to whether the largest value among all of the electric-charge values that are read out from the plurality of photodiodes 41 (i.e., readout voltage values) is within a predetermined appropriate range or not (step S160). The reason why the largest value among them is used for the above-described judgment is to ensure that the set pulse time width falls within a range in which a detection value does not saturate in subsequent processing. Herein, the preset appropriate range is a range that is empirically determined on the basis of the quality of readout images. Such a predetermined appropriate range is stored in the ROM 23. If it is judged that the largest value among all of the electric-charge values that are read out from the plurality of photodiodes 41 is not within the predetermined appropriate range (step S160: NO), the pulse time width TM is corrected slightly by a predetermined correction amount "d" (which is assumed to be 2 µs in the present embodiment of the invention) so as to attempt to enter the corrected value within the predetermined appropriate range (step S170). Thereafter, the processing flow of the step S140 and subsequent steps is repeated. Specifically, if it is judged that the largest value among all of the electric-charge values that are read out from the plurality of photodiodes 41 is greater than the predetermined appropriate range, the pulse time width TM is shortened slightly by the predetermined correction amount "d" (which is assumed to be 2 μs in the present embodiment of the invention), whereas if it is judged that the largest value among all of the electric-charge values that are read out from the plurality of photodiodes 41 is less than the predetermined appropriate range, the pulse time width TM is lengthened slightly by the predetermined correction amount "d" (2 μs). Then, if it is judged that the largest value (after being subjected to the above-described correction processing, if necessary) is within the predetermined appropriate range in the step S160 (step S160: YES), the current pulse time width TM is set as the configured pulse time width TM-red for red color component (step S180). In the next step, it is judged whether the setting of the pulse time width has been completed for all of red light, green light, and blue light (step S190). If it is judged that the setting of the pulse time width has not been completed yet for any of red light, green light, and blue light (step S190: NO), the CPU 22 of the main controller 21 designates the next (e.g., second) color component (e.g., green) as the illumination-time-period setting target color (step S200). Then, the above-described series of processing steps S120-S190 is carried out for the newly designated illumination-time-period setting target color. In this way, the pulse time width TM-green for green color component and the pulse time width TM-blue for blue color component are set. In the setting of the pulse time width TM-green for green color component and the pulse time width TM-blue for blue color component, as done in the setting of the pulse time width TM-red for red color component, the G pulsed light whose number of pulses is five and the B pulsed light whose number of pulses is five are emitted from the green LED 31G and the blue LED 31B, respectively, according to the present embodiment of the invention.

After judging that the setting of the pulse time width has been completed for all of red light, green light, and blue light in the judgment step S190, the CPU 22 of the main controller 21 operates the driving motor 39 so as to transport the carriage 30 to a predetermined reading start position, which is not shown in the drawing (step S210). Then, the CPU 22 of the main controller 21 further operates the driving motor 39 so as to start the movement of the carriage 30 at a constant speed (step S220). Thereafter, a shift signal is sent to the CIS 36 so as to discard any unwanted electrical charge accumulated thereat (step S230). In the next step, the operation of the red LED 31R is controlled in such a manner that red pulsed light whose number of pulses is K (which is, as has already been explained above, assumed to be one in the present embodiment of the invention) and whose pulse time width is TM-red that is configured (i.e., set) for red color component is irradiated onto the image scan target original document P (step S240). In the next step, the operation of the green LED 31G is controlled in such a manner that green pulsed light whose number of pulses is L (which is, as has already been explained above, assumed to be three in the present embodiment of the invention) and whose pulse time width is TM-green that is configured for green color component is irradiated onto the image scan target original document P (step S250). In the next step, the operation of the blue LED 31B is controlled in such a manner that blue pulsed light whose number of pulses is M (which is, as has already been explained above, assumed to be one in the present embodiment of the invention) and whose pulse time width is TM-blue that is configured for blue color component is irradiated onto the image scan target original document P (step S260). Then, after the elapsing of a predetermined shift signal time interval (e.g., 6 ms), a shift signal is sent to the CIS 36 so as to read out electric charge that is accumulated in the photodiodes 41 (step S280). In this way, image-reading operation for one line extending along the main scan direction is completed. Next, a judgment is made as to whether image-reading operation for all lines has already been finished or not (step S290). The judgment as to whether image-reading operation for all lines has already been finished or not can be made on the basis of the result of a sub-judgment made as to whether, for example, the traveling distance of the carriage 30 that is measured since it has started the constant-speed movement has become equal to the sub-scan length of an image scan target original document (i.e., dimension/size thereof along the sub-scan direction) that is inputted by a user or not. If it is judged that the image-reading operation for all lines has not been finished yet (step S290: NO), the process returns to the step S240 so as to read an image for the next line while executing the step S240 and subsequent steps. Through the execution of these steps in a repetitive (i.e., looped-back) manner, it is possible to acquire an entire image of the image scan target original document P. If it is judged that the image-reading operation for all lines has already been finished (step S290: YES), the CPU 22 of the main controller 21 ceases the operation of the driving motor 39 so as to stop the movement of the carriage 30 (step S300). Then, the monochrome image reading procedure according to the present embodiment of the invention ends. As explained above, in the monochrome image reading procedure according to the present embodiment of the invention, the operations of the red LED 31R, the green LED 31G, and the blue LED 31B are controlled in such a manner that the red pulsed light whose number of pulses is K and whose pulse time width is TM-red that is configured for red color component, the green pulsed light whose number of pulses is L and whose pulse time width is TM-green that is configured for green color component, and the blue pulsed light whose number of pulses is M and whose pulse time width is TM-blue that is configured for blue color component are irradiated onto the image scan target original document P, respectively. By this means, it is possible to irradiate the R pulsed light, the G pulsed light, and the B pulsed light that have an accurate or appropriate light-amount ratio among them that is significantly less vulnerable to a delay in light-amount change. In this way, it is possible to read out electric charge that is accumulated in the plurality of photodiodes 41 after the irradiation of such a set of the R pulsed light, the G pulsed light, and the B pulsed light, thereby reading the image scan target original document P, which could be a color manuscript or a monochrome manuscript, as a monochrome image in an enhanced manner.

Figure 3:
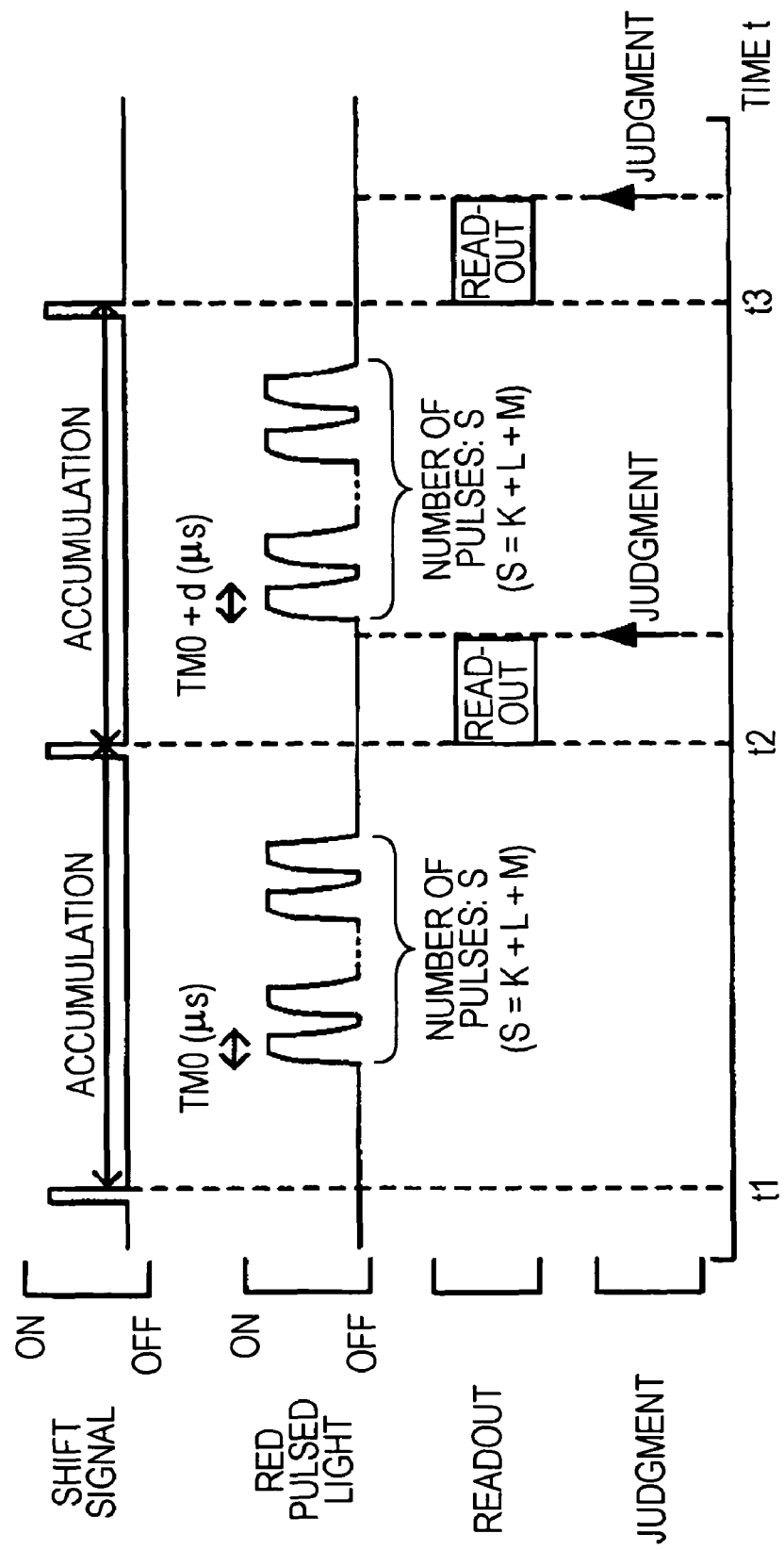
FIG. 3 is a timing chart that schematically illustrates an example of the level state of a shift signal and the level state of red light according to an exemplary embodiment of the invention, which applies at the time of the setting of a pulse time width.

Next, with reference to FIG. 3, a more detailed explanation of the above-described setting of the pulse time width for red light, green light, and blue light is given below. FIG. 3 is a timing chart that schematically illustrates an example of the level state of a shift signal and the level state of red light according to an exemplary embodiment of the invention, which is shown for a time period from a point in time at which the carriage 30 moves to the aforementioned position at which it can emit light to the white reference board 16 to a point in time at which the pulse time width TM-red is set for red color component. At a point in time t1, a shift signal is sent to the CIS 36 so as to discard any unwanted electrical charge accumulated thereat. Then, R pulsed light that has S pulses (which is assumed to be five pulses in the present embodiment of the invention as explained above) and the pulse time width TM0 (μs) is emitted. Then, after the aforementioned predetermined shift signal time interval has elapsed to reach a point in time t2, a shift signal is outputted so as to read electric charge that has been accumulated for red color component out of the plurality of photodiodes 41, which are arrayed, for example, in one line. In this example, it is assumed that the largest value among all of the electric-charge values that are read out from the plurality of photodiodes 41 (i.e., readout voltage values) is less than the aforementioned predetermined appropriate range. In such a case, in order to increase the amount of light for illumination thereof, the pulse time width TM is lengthened slightly by the aforementioned predetermined correction amount "d" (μs) (which is assumed to be 2 μs in the present embodiment of the invention); and as a result thereof, the pulse time width for red color component is configured as TM0+M (μs) (which is assumed to be 102 μs [100+2] in the present embodiment of the invention). Then, the R pulsed light that has S pulses (which is assumed to be five pulses in the present embodiment of the invention as explained above) and the pulse time width TM0+M (μs) is emitted. Then, after the aforementioned predetermined shift signal time interval has further elapsed to reach a point in time t3, a shift signal is outputted so as to read electric charge that has been accumulated for red color component out of the plurality of photodiodes 41, which are arrayed, for example, in one line. Herein, it is assumed that the largest value among all of the electric-charge values that are read out from the plurality of photodiodes 41, after being subjected to the above-described correction processing, falls within the aforementioned predetermined appropriate range. If so judged, the pulse time width TM-red for red color component is configured as TM0+M (μs) (which is assumed to be 102 μs in the present embodiment of the invention). In the same manner as done in the setting of the pulse time width TM-red for red color component described above, the setting of the pulse time width TM-green for green color component and the setting of the pulse time width TM-blue for blue color component are configured.

Next, with reference to FIG. 4, an explanation is given below of the illuminating operations of red light, green light, and blue light onto the image scan target original document P that are conducted when performing monochrome reading so as to acquire two lines of an image of the image scan target original document P after that the setting of the pulse time width for the red light, the green light, and the blue light has been configured as described above. FIG. 4 is a timing chart that schematically illustrates an example of the level state of a shift signal that gives a reading cue when each of red light, green light, and blue light is irradiated onto the image scan target original document P as well as the level state of each of the red light, the green light, and the blue light according to an exemplary embodiment of the invention. It should be noted that, in the illustrated pulse-configuration example, the pulse time width TM-red for red color component is set as D (μs), the pulse time width TM-green for green color component is set as E (μs), and the pulse time width TM-blue for blue color component is set as F (μs), where D is a substitute for TM0+M (i.e., TM0+M=D). In this example, it is assumed that these pulse time widths are set as follows: D=102 μs; E=104 μs; and F=98 μs. At a point in time t4, a shift signal is sent to the CIS 36 so as to discard any unwanted electrical charge accumulated thereat. Then, R pulsed light that has the K number of pulses (which is assumed to be one pulse in the present embodiment of the invention as explained above) and the pulse time width TM-red that is configured as D (μs) as explained above is irradiated onto the image scan target original document P. Thereafter, G pulsed light that has the L number of pulses (which is assumed to be three pulses in the present embodiment of the invention as explained above) and the pulse time width TM-green that is configured as E (μs) as explained above is irradiated onto the image scan target original document P. Subsequently, B pulsed light that has the M number of pulses (which is assumed to be one pulse in the present embodiment of the invention as explained above) and the pulse time width TM-blue that is configured as F (μs) as explained above is irradiated onto the image scan target original document P. Then, after the aforementioned predetermined shift signal time interval has elapsed to reach a point in time t5, a shift signal is outputted to the CIS 36 so as to read electric charge that has been accumulated out of the plurality of photodiodes 41. In the same manner as done at the point in time t5, electric charge is read out for the next line at a point in time t6.

In this paragraph, the corresponding relationships between component units described in an exemplary embodiment of the invention and constituent elements according to an aspect of the invention are explained. The image scan target original document P that is described in an exemplary embodiment of the invention corresponds to a "reading target object" according to an aspect of the invention. The red LED 31R that is described in an exemplary embodiment of the invention corresponds to a "red-light irradiating sub-section" according to an aspect of the invention. The green LED 31G that is described in an exemplary embodiment of the invention corresponds to a "green-light irradiating sub-section" according to an aspect of the invention. The blue LED 31B that is described in an exemplary embodiment of the invention corresponds to a "blue-light irradiating sub-section" according to an aspect of the invention. The light source unit 31 that is described in an exemplary embodiment of the invention corresponds to a "light irradiating section" according to an aspect of the invention. The CIS 36 that is described in an exemplary embodiment of the invention corresponds to a "reading section" according to an aspect of the invention. The main controller 21 that is described in an exemplary embodiment of the invention corresponds to a "setting section" according to an aspect of the invention. The main controller 21 that is described in an exemplary embodiment of the invention further corresponds to a "controlling section" according to an aspect of the invention. The shift signal that is described in an exemplary embodiment of the invention corresponds to a "reading instruction signal" according to an aspect of the invention. The white reference board 16 that is described in an exemplary embodiment of the invention corresponds to a "reference plate" according to an aspect of the invention. Finally, the pulse time width that is described in an exemplary embodiment of the invention corresponds to an "irradiation time period" according to an aspect of the invention. It should be noted that the explanation of the operations of the image scanning apparatus 10 according to an exemplary embodiment of the invention given above provides a descriptive and illustrative support for not only an image reading apparatus according to an aspect of the invention but also an image reading method according to an aspect of the invention.

In the configuration of the image scanning apparatus 10 according to an exemplary embodiment of the invention described above, R pulsed light (i.e., red pulse light), G pulsed light, and B pulsed light each of which has S pulses (i.e., the number of pulses thereof is S), where S is the sum of K, L, and M, each of which is a positive integer, where at least one of K, L, and M differs in its value from other two thereof are irradiated onto (e.g., emitted toward or illuminated onto) the white reference board 16. By this means, each of the pulse time width TM-red for red color component, the pulse time width TM-green for green color component, and the pulse time width TM-blue for blue color component is set in such a manner that each of the amount of light detected by the CIS 36 for the red color component, the amount of light detected by the CIS 36 for the green color component, and the amount of light detected by the CIS 36 for the blue color component falls within a predetermined appropriate range. In addition, in the configuration of the image scanning apparatus 10 according to an exemplary embodiment of the invention described above, the R pulsed light whose number of pulses is K and whose pulse time width TM-red is configured for red color component, the G pulsed light whose number of pulses is L and whose pulse time width TM-green is configured for green color component, and the B pulsed light whose number of pulses is M and whose pulse time width TM-blue is configured for blue color component are irradiated onto the image scan target original document P, respectively, during each predetermined shift signal time interval, which is defined as a time period from a point in time at which the CIS 36 reads out an accumulated image of the image scan target original document P (or discards any unwanted electrical charge accumulated thereat) to another point in time at which the CIS 36 reads out another (or an) accumulated image of the image scan target original document P. As explained above, in the configuration of the image scanning apparatus 10 according to an exemplary embodiment of the invention, the amount of light is controlled on the basis of the number of pulses. Therefore, advantageously, it is possible to irradiate the R pulsed light, the G pulsed light, and the B pulsed light that has an accurate or appropriate light-amount ratio among them that is significantly less vulnerable to a delay in light-amount change or to the level of such a change at the rising and falling of pulses. In the configuration of the image scanning apparatus 10 according to an exemplary embodiment of the invention, monochrome reading is carried out upon outputting a shift signal after the irradiation of red light, green light, and blue light. Therefore, it is possible to perform an enhanced (i.e., appropriate) monochrome reading while emitting light from the red LED 31R, the green LED 31G, and the blue LED 31B. Since the white reference board 16 is adopted, it is possible to configure (i.e., set) each of the pulse time width TM-red for red color component, the pulse time width TM-green for green color component, and the pulse time width TM-blue for blue color component in such a manner that the amount of light per pulse falls within a predetermined appropriate range (i.e., an appropriate value).

Needless to say, the invention should be in no case understood to be restricted to any exemplary embodiment thereof described above. That is, the invention may be configured or implemented in an adaptable manner in a variety of variations or modifications thereof without departing from the spirit thereof, which should be deemed to be encompassed within the technical scope thereof.

For example, in the exemplary embodiment of the invention described above, it is assumed that the target light-amount ratio A: B: C is set as 1: 3: 1. However, the scope of the invention is not limited to such a specific example. Any other target light-amount ratio may be adopted in place of 1: 3: 1. For example, it may be 2: 3: 1, or 2: 6: 2. In the exemplary embodiment of the invention described above, it is assumed that the above-mentioned set of values K, L, and M equals the target light-amount ratio A: B: C. However, the scope of the invention is not limited to such a specific example. The set of values K, L, and M may not equal the target light-amount ratio A: B: C. As a non-limiting modification example thereof, the following set of mathematical formulas may hold true: the value K=the value 2A; the value L=the value 2B; and the value M=the value 2C. In such a modified configuration, the number of pulses N of pulsed light that is irradiated at the time when the pulse time width is set (refer to the step S120 shown in FIG. 2) should be the sum of K, L, and M. For example, assuming that the modified target light-amount ratio A: B: C is 2: 3: 1, the number of pulses N should be six. Further assuming that the modified set of mathematical formulas defined above holds true, that is: the value K=the value 2A; the value L=the value 2B; and the value M=the value 2C, the number of pulses N should be twelve.

In the exemplary embodiment of the invention described above, it is assumed that the pulse time width TM is adjusted, that is, either lengthened or shortened, slightly by the predetermined correction amount of 2 µs at each correction attempt in the step S170 shown in FIG. 2. However, the scope of the invention is not limited to such a specific example. The unit amount of correction may be set on the basis of computation or the like. For example, instead of adjusting the pulse time width TM by the predetermined correction amount of 2 µs at each correction attempt in the step S170 of FIG. 2, the correction amount thereof may be determined on the basis of proportional computation that is performed by means of the pulse time width effective at that moment and further by means of a value read out in the step S150 of FIG. 2.

In the configuration of the image scanning apparatus 10 according to an exemplary embodiment of the invention described above, it is assumed that a set of three light sources, that is, the red LED 31R, the green LED 31G, and the blue LED 31B is adopted. However, the scope of the invention is not limited to such a specific example. The invention is applicable as long as light sources corresponding to three or more color components are used. For example, a set of four light sources, that is, for example, the red LED 31R, the green LED 31G, the blue LED 31B, and another fourth color LED may be adopted.

In the exemplary embodiment of the invention, it is assumed that red is pre-designated as the first illumination-time-period setting target color; that is, prior to the emission of green light and blue light, red light is emitted so as to set the pulse time width TM-red for red color component; and thereafter, green light is emitted so as to set the pulse time width TM-green for green color component, which is followed by the emission of blue light for the setting of the pulse time width TM-blue for blue color component. However, the scope of the invention is not limited to such a specific example. That is, the configuration of the image scanning apparatus 10 according to an exemplary embodiment of the invention described above may be modified as follows. These red light, green light, and blue light are sequentially emitted for accumulation of electric charge for the respective color components, followed by reading out thereof. The emission (i.e., irradiation or illumination) of light and the reading of accumulated electric charge are repeated while adjusting the pulse time widths thereof until the readout values fall within the predetermined appropriate range. In this modification example, the setting is finished for any color component for which the readout value has fallen within the predetermined appropriate range on a "first-come" basis while the setting is continued for any color component(s) for which the readout value has not yet fallen within the predetermined appropriate range.

In the steps S240, S250, and S260 (refer to FIG. 2) of the monochrome image reading procedure according to an exemplary embodiment of the invention described above, it is assumed that red light, green light, and blue light are sequentially emitted in the order of appearance herein. However, the scope of the invention is not limited to such a specific example. For example, the emission of these red light, green light, and blue light may be started at the same time.

In the configuration of the image scanning apparatus 10 according to an exemplary embodiment of the invention described above, it is explained that the CIS controller 25 is configured as a discrete controlling unit that is separated from the main controller 21. However, the scope of the invention is not limited to such a specific example. The CIS controller 25 and the main controller 21 may be configured as a single piece of integrated controlling unit.

In the exemplary embodiment of the invention, it is explained that the invention is applied to the image scanning apparatus 10 that uses the CIS 36 as its imaging component. However, the scope of the invention is not limited to such a specific example. The invention may be applied to other image scanning apparatus that uses a miniature optical system as long as it employs light sources corresponding to a plurality of color components.

What is claimed is:

1. An image reading apparatus comprising:
    a light irradiating section that has a red-light irradiating sub-section that irradiates red light onto a reading target object, a green-light irradiating sub-section that irradiates green light onto the reading target object, and a blue-light irradiating sub-section that irradiates blue light onto the reading target object;
    a reading section that detects the amount of each of the red light, the green light, and the blue light;
    a setting section that sets an irradiation time period for each of the red light, the green light, and the blue light on the basis of the corresponding amount of light detected by the reading section by commanding each of the red-light irradiating sub-section, the green-light irradiating sub-section, and the blue-light irradiating sub-section to irradiate light for a number of times S, where the number of times S is a sum of positive integers K, L, and M, where the positive integers K. L, and M correspond to a target light-amount ratio of red light, green light, and blue light, respectively, and where at least one of the positive integers K, L, and M differs in its value from other two thereof; and
    a controlling section that commands the red-light irradiating sub-section, the green-light irradiating sub-section, and the blue-light irradiating sub-section to irradiate light for the respective number of times K, L, and M for the respective irradiation time periods during each reading instruction signal time interval that is set for the reading section to read out an image of the reading target object.

2. The image reading apparatus according to claim 1, wherein the setting section sets an irradiation time period for each of the red light, the green light, and the blue light in such a manner that the corresponding amount of light detected by the reading section falls within an appropriate range by commanding each of the red-light irradiating sub-section, the green-light irradiating sub-section, and the blue-light irradiating sub-section to irradiate light onto a reference plate for the number of times S.

3. An image reading method for reading out an image by irradiating red light, green light, and blue light onto a reading target object, the image reading method comprising:
    setting an irradiation time period for each of the red light, the green light, and the blue light on the basis of the corresponding detection amount of light by commanding each of the red light, the green light, and the blue light to be irradiated for a number of times S, where the number of times S is a sum of positive integers K, L, and M, where the positive integers K, L, and M correspond to a target light-amount ratio of red light, green light, and blue light, respectively, and where at least one of the positive integers K, L, and M differs in its value from other two thereof; and
    commanding each of the red light, the green light, and the blue light to be irradiated for the respective number of times K, L, and M for the respective irradiation time periods during each reading instruction signal time interval that is set for an image of the reading target object to be read out.

* * * * *